United States Patent
Hurley et al.

(10) Patent No.: US 9,690,062 B2
(45) Date of Patent: Jun. 27, 2017

(54) FILM FOR A FLAME-RETARDANT FIBER OPTIC CABLE

(71) Applicant: Corning Optical Communications LLC, Hickory, NC (US)

(72) Inventors: William Carl Hurley, Hickory, NC (US); Ravinder Kumar Kinnera, Berlin (DE); Warren Welborn McAlpine, Hickory, NC (US); Joel Laine Parker, Hickory, NC (US); Christopher Mark Quinn, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 8 days.

(21) Appl. No.: 15/190,796

(22) Filed: Jun. 23, 2016

(65) Prior Publication Data

US 2016/0306129 A1    Oct. 20, 2016

Related U.S. Application Data

(63) Continuation of application No. PCT/US2014/069243, filed on Dec. 9, 2014.

(60) Provisional application No. 61/921,763, filed on Dec. 30, 2013.

(51) Int. Cl.
G02B 6/44    (2006.01)

(52) U.S. Cl.
CPC ......... *G02B 6/4436* (2013.01); *G02B 6/4433* (2013.01); *G02B 6/4434* (2013.01); *G02B 6/449* (2013.01); *G02B 6/4413* (2013.01)

(58) Field of Classification Search
CPC .. G02B 6/4436; G02B 6/4433; G02B 6/4434; G02B 6/4413; G02B 6/449
See application file for complete search history.

(56) References Cited

U.S. PATENT DOCUMENTS

| | | | | |
|---|---|---|---|---|
| 5,155,789 A | * | 10/1992 | Le Noane | G02B 6/441 385/102 |
| 5,343,549 A | * | 8/1994 | Nave | G02B 6/4436 385/103 |
| 5,388,175 A | * | 2/1995 | Clarke | G02B 6/4401 385/100 |

(Continued)

FOREIGN PATENT DOCUMENTS

| | | |
|---|---|---|
| EP | 2163927 A1 | 3/2010 |
| EP | 1610163 B1 | 10/2011 |

(Continued)

OTHER PUBLICATIONS

Nextrom, "SZ Stranding Line OFC 70," 2 pages, Last accessed on Feb. 21, 2014 from http://www.nextrom.com/877_en_SZ-Stranding-Line.aspx.

(Continued)

*Primary Examiner* — Peter Radkowski
(74) *Attorney, Agent, or Firm* — William D. Doyle

(57) ABSTRACT

A flame-retardant fiber optic cable includes core elements, a film surrounding the core elements, and a jacket surrounding the film. The core elements include one or more optical fibers and at least one tube surrounding the one or more optical fibers. The material composition of the film differs from the jacket and the film is relatively thin.

20 Claims, 5 Drawing Sheets

(56) References Cited

U.S. PATENT DOCUMENTS

| | | | | |
|---|---|---|---|---|
| 5,561,195 | A * | 10/1996 | Govoni | B32B 27/32 |
| | | | | 525/240 |
| 5,675,686 | A * | 10/1997 | Rosenmayer | G02B 6/443 |
| | | | | 385/114 |
| 5,684,904 | A * | 11/1997 | Bringuier | G02B 6/4494 |
| | | | | 385/106 |
| 6,195,487 | B1 * | 2/2001 | Anderson | G02B 6/4416 |
| | | | | 174/23 R |
| 6,228,449 | B1 * | 5/2001 | Meyer | B62D 25/2072 |
| | | | | 428/218 |
| 6,317,540 | B1 * | 11/2001 | Foulger | G02B 6/4469 |
| | | | | 324/555 |
| 6,348,249 | B2 * | 2/2002 | Meyer | 428/218 |
| 6,480,653 | B1 * | 11/2002 | Hulin | G02B 6/4413 |
| | | | | 385/100 |
| 6,483,971 | B2 * | 11/2002 | Gaillard | G02B 6/443 |
| | | | | 385/113 |
| 6,519,399 | B2 * | 2/2003 | Strong | G02B 6/4411 |
| | | | | 385/109 |
| 6,546,712 | B2 * | 4/2003 | Moss | G02B 6/449 |
| | | | | 242/413.5 |
| 6,574,400 | B1 * | 6/2003 | Lail | G02B 6/4494 |
| | | | | 385/100 |
| 6,640,033 | B2 * | 10/2003 | Auvray | G02B 6/4436 |
| | | | | 385/109 |
| 6,993,226 | B2 * | 1/2006 | Castellani | C08L 23/16 |
| | | | | 385/100 |
| 7,212,715 | B2 * | 5/2007 | Dallas | G02B 6/4434 |
| | | | | 385/100 |
| 7,406,233 | B2 * | 7/2008 | Seddon | G02B 6/4494 |
| | | | | 385/100 |
| 7,619,038 | B2 * | 11/2009 | Mehta | C08L 23/10 |
| | | | | 524/515 |
| 7,790,641 | B2 * | 9/2010 | Baker, Jr. | A41D 31/02 |
| | | | | 428/364 |
| 8,063,148 | B2 * | 11/2011 | Gahleitner | C08J 3/005 |
| | | | | 525/191 |
| 8,173,900 | B2 * | 5/2012 | Martinez | H01B 3/441 |
| | | | | 174/102 R |
| 8,265,438 | B2 * | 9/2012 | Knoch | G02B 6/441 |
| | | | | 385/111 |
| 8,620,124 | B1 * | 12/2013 | Blazer | G02B 6/4489 |
| | | | | 385/102 |
| 8,798,417 | B2 * | 8/2014 | Blazer | G02B 6/4489 |
| | | | | 385/112 |
| 2002/0122640 | A1 * | 9/2002 | Strong | G02B 6/4411 |
| | | | | 385/114 |
| 2003/0103742 | A1 * | 6/2003 | Auvray | G02B 6/4436 |
| | | | | 385/109 |
| 2003/0139492 | A1 * | 7/2003 | Abu-Isa | C08K 3/0008 |
| | | | | 523/179 |
| 2003/0168243 | A1 * | 9/2003 | Jamet | G02B 6/4482 |
| | | | | 174/113 R |
| 2005/0016755 | A1 * | 1/2005 | Martinez | H01B 3/441 |
| | | | | 174/120 R |
| 2005/0063650 | A1 * | 3/2005 | Castellani | C08L 23/16 |
| | | | | 385/100 |
| 2005/0238300 | A1 * | 10/2005 | Jamet | G02B 6/4438 |
| | | | | 385/100 |
| 2005/0286843 | A1 * | 12/2005 | Dallas | G02B 6/4434 |
| | | | | 385/109 |
| 2006/0183860 | A1 * | 8/2006 | Mehta | C08L 23/10 |
| | | | | 525/191 |
| 2007/0054579 | A1 * | 3/2007 | Baker, Jr. | A41D 31/02 |
| | | | | 442/364 |
| 2008/0118211 | A1 * | 5/2008 | Seddon | G02B 6/4494 |
| | | | | 385/114 |
| 2008/0153997 | A1 * | 6/2008 | Casty | C08F 10/06 |
| | | | | 526/88 |
| 2009/0016687 | A1 * | 1/2009 | Kang | G02B 6/4494 |
| | | | | 385/128 |
| 2009/0068453 | A1 * | 3/2009 | Chung | B32B 27/08 |
| | | | | 428/337 |
| 2009/0074364 | A1 * | 3/2009 | Bringuier | G02B 6/02357 |
| | | | | 385/103 |
| 2010/0067856 | A1 * | 3/2010 | Knoch | G02B 6/441 |
| | | | | 385/111 |
| 2010/0331490 | A1 * | 12/2010 | Gahleitner | C08J 3/005 |
| | | | | 525/209 |
| 2012/0006373 | A1 * | 1/2012 | Stehly | E04H 15/50 |
| | | | | 135/140 |
| 2012/0063731 | A1 * | 3/2012 | Fitz | G02B 6/4495 |
| | | | | 385/104 |
| 2012/0257864 | A1 * | 10/2012 | Consonni | G02B 6/441 |
| | | | | 385/112 |

FOREIGN PATENT DOCUMENTS

| | | | |
|---|---|---|---|
| JP | 08218286 | A * | 8/1996 |
| WO | WO 02074843 | A2 * | 9/2002 |
| WO | 2013130121 | A1 | 9/2013 |
| WO | 2014052224 | A2 | 4/2014 |

OTHER PUBLICATIONS

Marik, J., "Advanced SZ Stranding Technology for Enhanced Applications," 4 pages, Last accessed on Feb. 21, 2014 from http://rosendahlaustria.com/custom/rosendahl austria/Rosendahl_ Products_PDF/1062003111324_pl_.pdf.

Rechberger, M., Hörschläger, W., "Buffering & SZ-Stranding Process for Compact Dry Tube FO-Cable," Proceedings of the 56th Annual International Wire & Cable Symposium, 2007, -pp. 614-617, Last accessed on Feb. 24, 2014 from http://ecadigitallibrary.com/pdf/IWCS07/15_5.pdf.

Patent Cooperation Treaty, International Search Report and Written Opinion for PCT/US2014/069243, mail date Jun. 10, 2015, 16 pages.

* cited by examiner

FILM FOR A FLAME-RETARDANT FIBER OPTIC CABLE

RELATED APPLICATIONS

This application is a continuation of International Application No. PCT/US2014/69243, filed on Dec. 9, 2014, which claims the benefit of priority to U.S. Provisional Application No. 61/921,763, filed Dec. 30, 2013, both applications being incorporated herein by reference.

BACKGROUND

Aspects of the present disclosure relate generally to cables, such as fiber optic cables that may support and carry optical fibers as well as other cable components.

Fiber optic cable, especially those in jurisdictions and applications with strict fire and smoke regulations, are designed to minimize the spread of fire, smoke, poisonous gases, and other hazards related to fire. Often thick jackets of flame-retardant material are used to block flames from reaching core components of the cables. However, conventional cables typically include components, such as polyester binder yarns, and structures, such as air gaps in the core, that may facilitate spreading of smoke and flame. A need exists for fiber optic cables, including new cable structures and components thereof, that are flame retardant and/or reduce hazards associated with fire.

SUMMARY

Some embodiments relate to a fiber optic cable that includes core elements, a binder film surrounding the core elements, and a jacket surrounding the binder film. The core elements include an optical fiber and a tube surrounding the optical fiber. The binder film includes a base material and a filler material. The base material is primarily formed from a polymer. The filler material is a flame-retardant material and is dispersed in the base material. The binder film is a binder for the core elements, opposing outwardly transverse deflection of one or more of the core elements. The binder film is thin, having an average thickness over a 10-meter length of the cable that is less than half an average thickness of the jacket over the 10-meter length.

Other embodiments relate to a fiber optic cable that includes core elements and a multi-layered flame-retardant film structure surrounding the core elements. The core elements include an optical fiber and a tube surrounding the optical fiber. The film structure includes a first film and a second film. Both the first and second films may include extrudable polymers that include a base material and a flame-retardant filler material. Also, both the first and second films may have an average thickness over a 10-meter length of the cable that is less than 500 micrometers.

Still other embodiments relate to a fiber optic cable that includes a core of the cable comprising core elements, a film surrounding the core elements, and a jacket surrounding the film. The core elements support an optical fiber and form interstices with respect to one another. The film includes a base layer comprising a polymer and powder particles partially embedded in the base layer. The powder particles are embedded such that the powder particles have a portion thereof submerged in the base layer passing partly through a surface plane of the base layer and another portion thereof exposed partially projecting away from the surface plane of the base layer. At least some (e.g., at least 10% by weight, at least 50% by weight) of the powder particles are positioned on an inside surface of the base layer between the base layer and the core elements and extend into the interstices. The jacket comprises flame-retardant filler material.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures and/or described elsewhere in the text.

Figure 1:
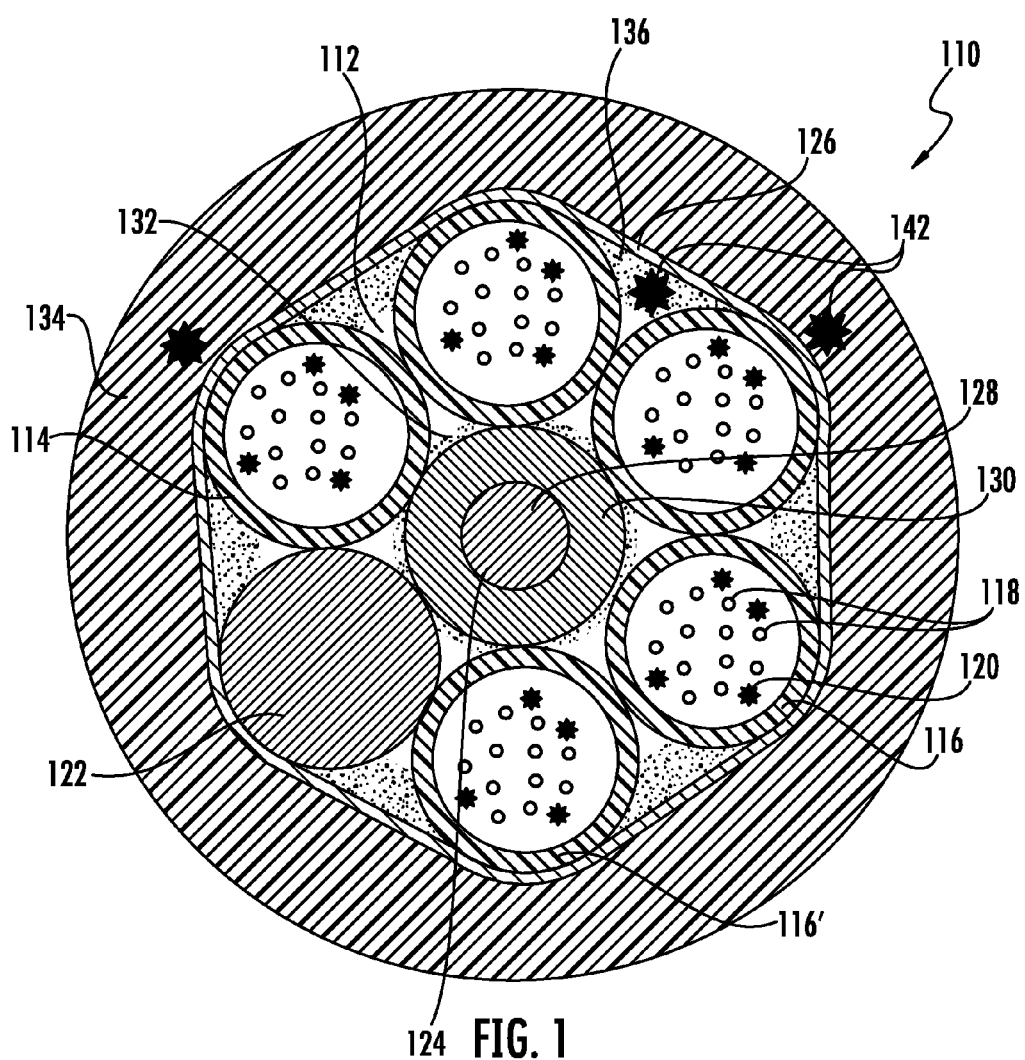
FIG. 1 is a cross-sectional view of a fiber optic cable according to an exemplary embodiment.

Referring to FIG. 1, a cable in the form of a fiber optic cable 110 may be an outside-plant loose tube cable, an indoor cable with fire-resistant/retardant properties, an indoor/outdoor cable, or another type of cable, such as a datacenter interconnect cable with micro-modules or a hybrid fiber optic cable including conductive elements. According to an exemplary embodiment, the cable 110 includes a core 112 (e.g., sub-assembly, micro-module), which may be located in the center of the cable 110 or elsewhere and may be the only core of the cable 110 or one of several cores. According to an exemplary embodiment, the core 112 of the cable 110 includes core elements 114.

In some embodiments, the core elements 114 include a tube 116, such as a buffer tube surrounding at least one optical fiber 118, a tight-buffer surrounding an optical fiber, or other tube. According to an exemplary embodiment, the tube 116 may contain two, four, six, twelve, twenty-four or other numbers of optical fibers 118. In contemplated embodiments, the core elements 114 additionally or alternatively include a tube 116 in the form of a dielectric insulator surrounding a conductive wire or wires, such as for a hybrid cable.

In some embodiments, the tube 116 further includes a water-blocking element, such as gel (e.g., grease, petroleum-based gel) or an absorbent polymer (e.g., super-absorbent polymer particles or powder). In some such embodiments, the tube 116 includes yarn 120 carrying (e.g., impregnated with) super-absorbent polymer, such as at least one water-blocking yarn 120, at least two such yarns, or at least four such yarns per tube 116. In other contemplated embodiments, the tube 116 includes super-absorbent polymer without a separate carrier, such as where the super-absorbent polymer is loose or attached to interior walls of the tube. In some such embodiments, particles of super-absorbent polymer are partially embedded in walls of the tube 116 (interior and/or exterior walls of the tube) or bonded thereto with an adhesive. For example, the particles of super-absorbent polymer may be pneumatically sprayed onto the tube 116 walls during extrusion of the tube 116 and embedded in the tube 116 while the tube 116 is tacky, such as from extrusion processes.

According to an exemplary embodiment, the optical fiber 118 of the tube 116 is a glass optical fiber, having a fiber optic core surrounded by a cladding (shown as a circle surrounding a dot in FIG. 1). Some such glass optical fibers may also include one or more polymeric coatings. The optical fiber 118 of the tube 116 is a single mode optical fiber in some embodiments, a multi-mode optical fiber in other embodiments, a multi-core optical fiber in still other embodiments. The optical fiber 118 may be bend resistant (e.g., bend insensitive optical fiber, such as CLEARCURVE™ optical fiber manufactured by Corning Incorporated of Corning, N.Y.). The optical fiber 118 may be color-coated and/or tight-buffered. The optical fiber 118 may be one of several optical fibers aligned and bound together in a fiber ribbon form.

According to an exemplary embodiment, the core 112 of the cable 110 includes a plurality of additional core elements (e.g., elongate elements extending lengthwise through the cable 110), in addition to the tube 116, such as at least three additional core elements, at least five additional core elements. According to an exemplary embodiment, the plurality of additional core elements includes at least one of a filler rod 122 and/or an additional tube 116'. In other contemplated embodiments, the core elements 114 may also or alternatively include straight or stranded conductive wires (e.g., copper or aluminum wires) or other elements. In some embodiments, the core elements are all about the same size and cross-sectional shape (see FIG. 1), such as all being round and having diameters of within 10% of the diameter of the largest of the core elements 114. In other embodiments, core elements 114 may vary in size and/or shape.

Figure 2:
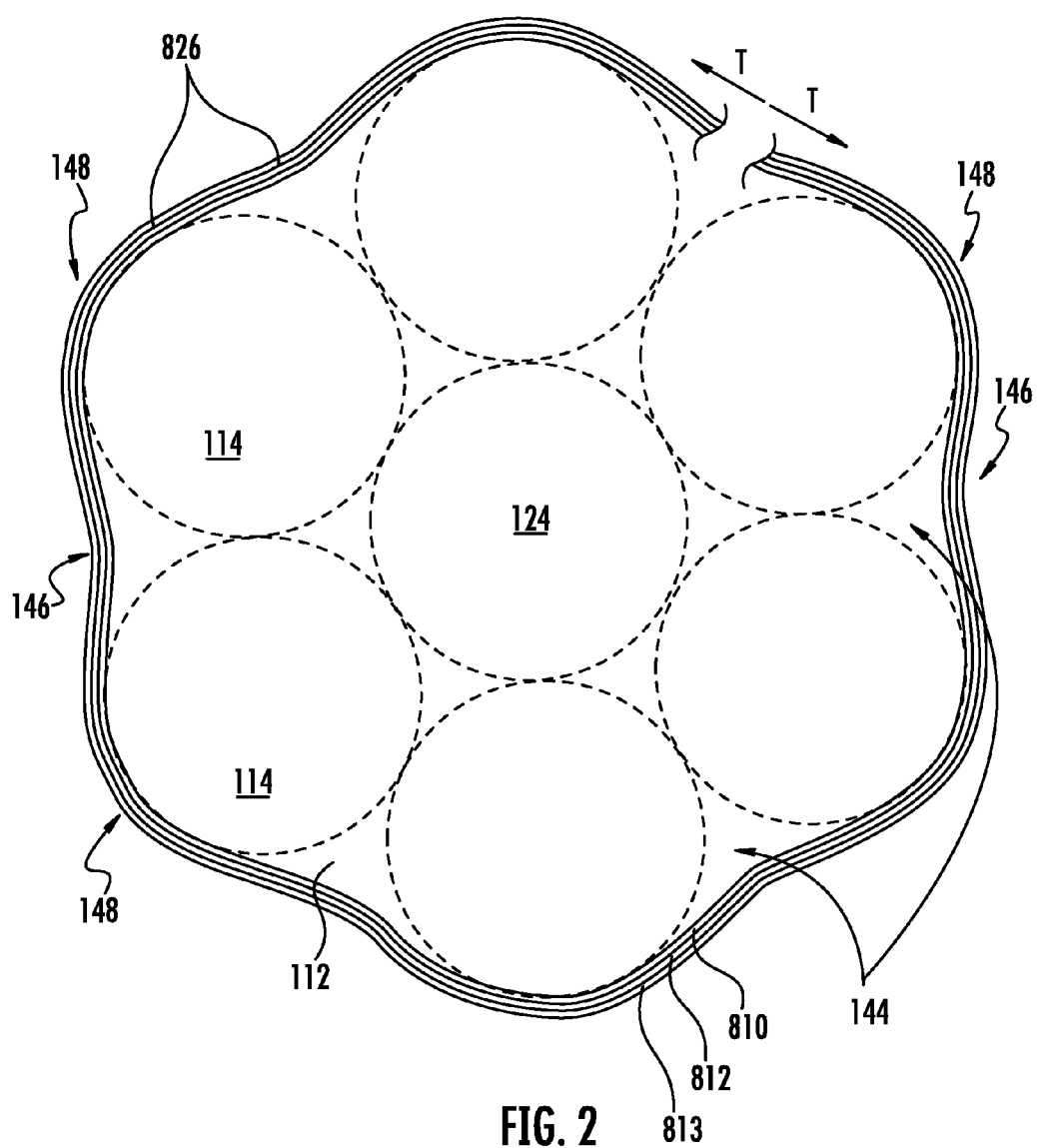
FIG. 2 is a schematic diagram of a fiber optic cable according to an exemplary embodiment.

Referring now to FIGS. 1-2, the cable 110 includes a film (e.g., membrane, sleeve), shown as a single-layered film 126 in FIG. 1 and as a composite film 826 (e.g., multi-layered film structure) in FIG. 2, exterior to some or all of the core elements 114.

In some embodiments, the film may serve as a binder, where the tube 116 and the plurality of additional core elements 116', 122 are at least partially constrained (i.e., held in place) and directly or indirectly bound to one another by the film 126. In some embodiments, the film 126 directly contacts the core elements 114. For example, tension T in the film 126 (see also FIG. 2A) may hold the core elements 114 against a central strength member 124 and/or one another. The loading of the film 126 may further increase interfacial loading (e.g., friction) between the core elements 114 with respect to one another and other components of the cable 110, thereby constraining the core elements 114. In contemplated embodiments, the film is a single layer.

In some embodiments, the single-layered film 126 is formed from a base or substrate polymer, such as polyethylene, polypropylene, etc., and flame-retardant filler material mixed therein (e.g., fire-retardant, fire-resistant, fire-proof, flame-resistant, etc. material). Examples of such filler material include as aluminum hydroxide (ATH), magnesium hydroxide (MDH), huntite and hydromagnesite, hydrates, red phosphorus, boron compounds such as borates, organohalogen compounds, and organophosphorus compounds. According to an exemplary embodiment, the film 826 is formed from two or more layers, which may include flame-retardant materials. The layers of the film may be compositionally different from one another, as further discussed below.

According to an exemplary embodiment, the films 126, 826 includes (e.g., is formed from, is formed primarily from, has some amount of) a polymeric material such as one or more layers of polyethylene (e.g., low-density polyethylene, medium density polyethylene, high-density polyethylene), polypropylene, polyurethane, or other polyolefin materials or other polymers, such as polyamides (e.g., nylon). In some embodiments, individual layer(s) of the film 126 include at least 30% by weight, at least 50% by weight, and/or at least 70% by weight polyethylene or another such of the above polymers, and may further include stabilizers, nucleation initiators, fillers, flame-retardant additives, reinforcement elements (e.g., chopped fiberglass fibers), and/or combinations of some or all such additional components or other components.

According to an exemplary embodiment, one or more layers of the films 126, 826 are formed from a material having a Young's modulus of 3 gigapascals (GPa) or less, thereby providing a relatively high elasticity or springiness to the films 126, 826 so that the films 126, 826 may conform to the shape of the core elements 114 and not overly distort the core elements 114, thereby reducing the likelihood of attenuation of optical fibers 118 corresponding to the core elements 114. In other embodiments, the films 126, 826 include one or more layers formed from a material having a Young's modulus of 5 GPa or less, 2 GPa or less, or a different elasticity, which may not be relatively high.

According to an exemplary embodiment, the films 126, 826 are thin, such as with individual layers thereof, and/or two or more layers thereof, and/or the entire film 126 being 0.5 mm or less in thickness (e.g., about 20 mil or less in thickness, where "mil" is 1/1000th inch). In some such embodiments, the films 126, 826 are 0.2 mm or less (e.g., about 8 mil or less), such as greater than 0.05 mm and/or less than 0.15 mm. In some embodiments, the films 126, 826 are in a range of 0.4 to 6 mil in thickness, or another thickness. In contemplated embodiments, the films 126, 826 may be greater than 0.5 mm and/or less than 1.0 mm in thickness. In some cases, for example, the films 126, 826 have roughly the thickness of a typical garbage bag. The thickness of the films 126, 826 may be less than a tenth the maximum cross-sectional dimension of the respective cable, such as less than a twentieth, less than a fiftieth, less than a hundredth, while in other embodiments the films 126, 826 may be otherwise sized relative to the cable cross-section. In some embodiments, when comparing average cross-sectional thicknesses, the jacket 134, as shown in FIG. 1, is thicker than either of the films 126, 826, such as at least twice as thick as either of the films 126, 826, at least ten times as thick as either of the films 126, 826, at least twenty times as thick as either of the films 126, 826. In other contemplated embodiments, a cable with the films 126, 826 may not require and/or a jacket, such as with a 0.4 mm or less nylon skin-layer extruded over a 0.5 mm or less polyethylene interior film layer.

Figure 4:
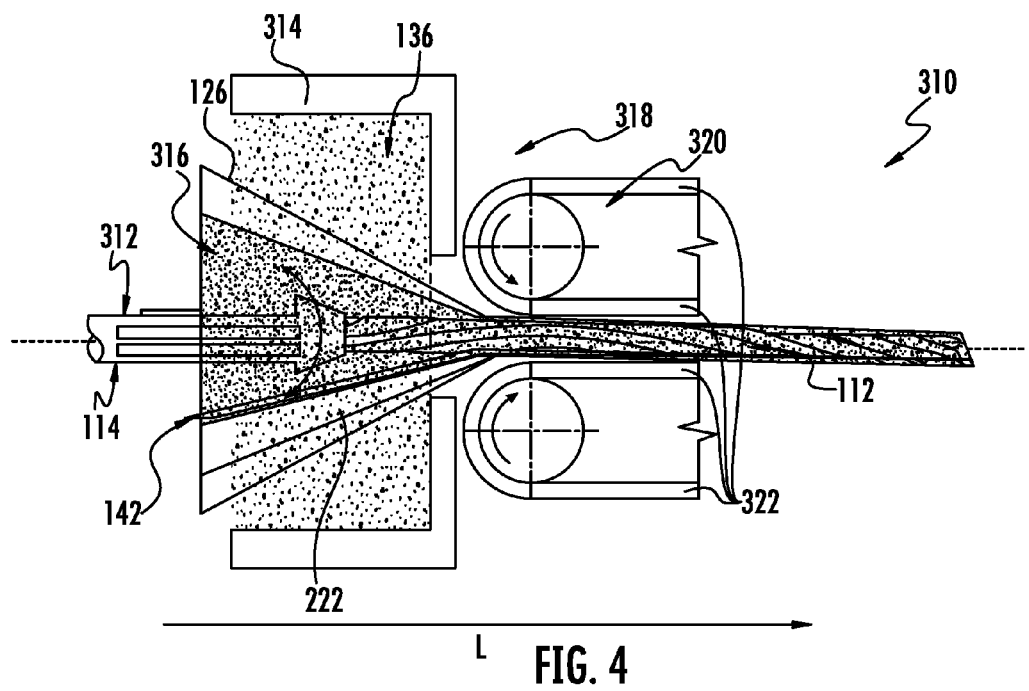
FIG. 4 is a side cross-sectional view of powder particles attaching to a film according to an exemplary embodiment.

Use of a relatively thin films 126, 826, and correspondingly thin layers thereof, allows for rapid cooling (e.g., on the order of milliseconds, as further discussed with regard to the process 310 shown in FIG. 4) of the films 126, 826 during manufacturing and, in some embodiments thereby allowing the film 126 to quickly hold the core elements 114 in place, such as in a particular stranding configuration, facilitating manufacturing. Subsequent to the application of the films 126, 826, the manufacturing process may further include applying a thicker jacket 134 to the exterior of the films 126, 826, thereby improving robustness and/or weather-ability of the cable 110 (see generally FIG. 1). In other contemplated embodiments, the core 112, surrounded by either of the films 126, 826, may be used and/or sold as a finished product (see generally FIG. 2).

Still referring to FIG. 1, the cable 110 further includes the central strength member 124, which may be a dielectric strength member, such as an up jacketed glass-reinforced composite rod. In other embodiments, the central strength member 124 may be or include a steel rod, stranded steel, tensile yarn or fibers (e.g., bundled aramid), or other strengthening materials. As shown in FIG. 1, the central strength member 124 includes a center rod 128 and is up jacketed with a polymeric material 130 (e.g., polyethylene with flame-retardant additive, polyvinyl chloride with flame-retardant additive, low-smoke zero-halogen polymer).

According to an exemplary embodiment, powder particles 132, such as (1) super-absorbent polymer and/or another powder (e.g., talc) or another water-absorbing component (e.g., water-blocking tape, water-blocking yarns), (2) particles of flame-retardant material, such as those flame-retardant materials disclosed herein, (3) solid lubricant powders, such as talcum powder, graphite, etc., and/or (4) particles of intumescent material, such as materials containing at least 10% hydrates by weight, at least 30% hydrates by weight, at least 50% hydrates by weight, sodium silicates, and/or graphite, are attached to the outer surface of the central strength member 124. Combinations of such powder particles may be used together, such as intumescent and flame-retardant powder. Further, some such powder particles may serve multiple, synergistic purposes, such as graphite serving to form a hard char layer upon exposure to fire and also serving to control coupling (e.g., lower friction) between adjoining surfaces.

According to an exemplary embodiment, the intumescent particles are formed from one or more intumescent materials that expands and forms char upon exposure to heat. The expansion of the intumescent material provides fire resistance by blocking air flow through cable jacket, such as through interstices formed between components in the core. In various embodiments, intumescent particles are configured to expand in volume more than 500 times their unexpanded volume in the presence of fire, and in other embodiments are configured to expand in volume more than 1000 times their unexpanded volume in the presence of fire. In addition, the char formation provides a layer material with low heat transfer characteristics. In various embodiments, intumescent particles may include intumescent materials that form light char and/or include intumescent materials that form hard char. In various embodiments, the intumescent material of particles include one or more of the Exolit materials commercially available from Clariant, such as Exolit AP 765 (TP) material, intumescent powders manufactured by CeaseFire, intumescent powders manufactured by Zhejiang Longyou Sihai Chemical Industry Co., Ltd., Qingdao Sungraf Chemical Industry Co., Ltd., Dalian CR Science Development Co., Ltd., Weifang Menjie Chemicals Co., Ltd., or other manufacturers. At least some of the powder particles 132 may be partially embedded in the up jacket 130, and attached thereto by pneumatically spraying the particles 132 against the up jacket 130 while the up jacket 130 is in a tacky and/or softened state. The powder particles 132 may increase or otherwise affect coupling between the central strength member 124 and the core elements 114 around the central strength member 124.

According to an exemplary embodiment, the powder particles 132, 136 include super-absorbent polymer particles (e.g., sodium polyacrylate, ethylene maleic anhydride copolymer, polyacrylamide copolymer, polyvinyl alcohol copolymers, cross-linked polyethylene oxide, cross-linked carboxymethylcellulose, and starch-grafted copolymer of polyacrylonitrile) and the amount of super-absorbent polymer particles is less than 100 grams per square meter of surface area ($g/m^2$) of the respective component to which the powder particles are coupled (central strength member 124 or film 126). In some such embodiments, the amount of super-absorbent polymer particles is between 20 and 60 $g/m^2$, such as between 25 and 40 $g/m^2$. According to an exemplary embodiment, the amount of super-absorbent polymer or other water-blocking elements used in the cable is at least sufficient to block a one-meter pressure head of tap water in a one-meter length of the cable 110, according to industry standard water penetration tests, which may correspond to the above quantities, depending upon other characteristics of the respective cable 110, such as interstitial spacing between core elements 114.

Alternatively or in addition thereto, the particles 132 may be attached to the up jacket 130 with an adhesive. In some embodiments, the central strength member 124 includes the rod 128 without an up-jacket, and the particles 132 may be attached to the rod 128. In contemplated embodiments, a strength member, such as a glass-reinforced rod or up jacketed steel rod, includes particles 132 attached to the outer surface thereof, as disclosed above, without the strength member being a central strength member.

In some embodiments, the core elements 114 are stranded (i.e., wound) about the central strength member 124. The core elements 114 may be stranded in a repeating reverse-oscillatory pattern, such as so-called S-Z stranding (see generally FIGS. 4-7) or other stranding patterns (e.g., helical). The film 126 may constrain the core elements 114 in the stranded configuration, facilitating mid-span or cable-end access of the optical fibers 118 (see FIG. 8) and cable bending, without the core elements 114 releasing tension by expanding outward from the access location or a bend in the core 112 of the cable 110.

In other contemplated embodiments, the core elements 114 are non-stranded. In some such embodiments, the core elements 114 include micro-modules or tight-buffered optical fibers that are oriented generally in parallel with one another inside the film 126. For example, harness cables and/or interconnect cables may include a plurality of micro-modules, each including optical fibers and tensile yarn (e.g., aramid), where the micro-modules are bound together by the film 126 (see generally FIG. 2). The aramid may be between the film 126 and the jacket 134 and/or the aramid may be inside the film 126, such as surrounding the stranded sub-units (e.g., buffer tubes, tight-buffered fibers, micro-modules). Some such cables may not include a central strength member. Some embodiments, include multiple cores or sub-assemblies, each bound by a film 126, and jacketed together in the same carrier/distribution cable, then the multiple cores or sub-assemblies may be bound together with yet another film. For some such embodiments, techniques disclosed herein for rapid cooling/solidification during extrusion and inducing radial tension in the film 126 for coupling to a central strength member 124 may be unnecessary for manufacturing. Features of the cable 110 can be mixed and matched in different combinations to form other cables according to the disclosure herein.

Referring again to FIG. 1, in some embodiments the film 126 of the cable 110 includes powder particles 136, which may be used for providing water blocking, retarding fire, choking off interstices (i.e., reducing the so called "chimney effect"), and/or for controlling coupling (e.g., decoupling) of adjoining surfaces in the cable 110. In some embodiments, the powder particles 132, 136 have an average maximum cross-sectional dimension of 500 micrometers (μm) or less, such as 250 μm or less, 100 μm or less. Accordingly, the particles 132, 136 embedded in the film 126 may be larger than similar such particles that may be used inside the tubes 116, impregnated in yarns or embedded in interior walls of the tubes 116 as disclosed above, which may have an average maximum cross-sectional dimension less than 75 μm, to mitigate optical fiber micro-bend attenuation.

In some embodiments, at least some of the powder particles 136 are coupled directly or indirectly to the film 126 (e.g., attached bound directly thereto, adhered thereto, in contact therewith), such as coupled to a surface of the film 126, coupled to an exterior surface of the film 126, coupled to an outside surface of the film 126 and/or an inside surface of the film 126. According to an exemplary embodiment, at least some of the powder particles 136 are partially embedded in the film 126, such as passing partly through a surrounding surface plane of the film 126 while partially projecting away from the surface of the film 126; or, put another way, having a portion thereof submerged in the film 126 and another portion thereof exposed. With intumescent powder particles 136, filling the interstitial spaces chokes off passageways through the core of the cable that may otherwise allow super-heated air and/or smoke to travel through the core. Applicants believe that when the intumescent material adjoins and/or extends from the inner surface of the film 126, 826, the intumescent material is less constrained than similar such material that is fully embedded in a jacket, and therefore the intumescent material more quickly and/or more fully chokes off the passageways through the core.

The powder particles 136 may be attached to the film 126 by pneumatically spraying the powder particles onto the film 126, into and outside of the associated extrusion cone (see also FIG. 4), as further discussed below. The pneumatic spraying may also facilitate rapid cooling of the film 126. In other embodiment, static electricity or other means may be used to motivate the powder particles 136 to embed in the film 126 or otherwise couple thereto. In other embodiments, glues or other attachment means are used to attach the powder particles 136 to the film 126. Use of the film 126 as a carrier for particles 136 may remove need for water-blocking tape, flame-retardant tape, or other components between the core and cable components outside the core, as well as remove need for binder yarn to hold such components in place. In still other embodiments, powder particles may be present but loose and/or not attached to the film 126. In contemplated embodiments, the film 126 may be coated with a continuous water-blocking, flame-retardant, low-friction, and/or intumescent material/layer; and/or the corresponding cable may include other types of water-blocking, flame-retardant, low-friction, and/or intumescent elements or may include no such elements.

According to an exemplary embodiment, at least some of the powder particles 136 are positioned on an inside surface of the film 126 (see FIG. 1) between the film 126 and the core elements 114. In addition to blocking water, retarding fire, blocking interstices, etc., such placement may mitigate adhesion between the film 126 and the core elements 114 during manufacturing of the cable 110, such as if the film 126 is tacky from extrusion or other manufacturing approaches, such as laser welding or heat softening. Alternatively or in combination therewith, in some embodiments, at least some of the powder particles 136 are positioned on an outside surface of the film 126 (see generally FIG. 4).

Powder particles 136 positioned on the outside surface of the film 126 may block water, retard fire, control friction/coupling, block interstitial spaces, etc. between the film 126 and components of a cable exterior thereto, such as metal or dielectric armor, another ring of stranded elements, micro-modules outside the core 112, or other components. Such armor may be corrugated steel or another metal and may also serve as a ground conductor, such as for hybrid fiber optic cables having features disclosed herein. Use of a film 126, instead of a thicker layer, allows a narrower "light armor" design, where there is no internal jacket between the armor and the core 112. Alternatively, such armor may be dielectric, such as formed from a tough polymer (e.g., some forms of polyvinyl chloride).

According to an exemplary embodiment, embedded material discontinuities in the jacket (see generally features 142 of FIG. 1 for placement of such features), such as narrow strips of co-extruded polypropylene embedded in a polyethylene jacket 134, may provide tear paths to facilitate opening the jacket 134. Alternatively, ripcords 142 (FIG. 1) in or adjoining the jacket 134 may facilitate opening the jacket 134. The powder particles 136 may further facilitate stripping the jacket 134 from the core 112 by decoupling surfaces adjacent to the powder particles 136. As such, depending upon placement of the powder particles 136, the particles 136 may facilitate decoupling of the jacket 134 from the film 126, such as for the cable 110 shown in FIG. 1 where the jacket 134 and film 126 are adjoining (i.e., particles 136 placed between the jacket 134 and film 126), and/or may facilitate decoupling of the film 126 from the core elements 114 (i.e., particles 136 placed between the film 126 and core elements 114).

In some embodiments, the film 126 and the jacket 134 are not colored the same as one another. For example, they may be colored with visually distinguishable colors, having a difference in "value" in the Munsell scale of at least 3. For example, the jacket 134 may be black while film 126 may be white or yellow, but both including (e.g., primarily consisting of, consisting of at least 70% by weight) polyethylene. In some contemplated embodiments, the jacket 134 is opaque, such as colored black and/or including ultra-violet light blocking additives, such as carbon-black; but the film 126 is translucent and/or a "natural"-colored polymer, without added color, such that less than 95% of visible light is reflected or absorbed by the film 126.

Accordingly, in at least some such embodiments, upon opening or peeling back the jacket 134 away from the film 126 and core 112, the tube 116 and at least some of the plurality of additional core elements 114 are at least partially visible through the film 126 while being constrained thereby with the film 126 unopened and intact, such as visible upon directing light from a 25 watt white light-bulb with a 20-degree beam directly on the film 126 from a distance of one meter or less in an otherwise unlit room. In contemplated embodiments, the core includes a tape or string (e.g., polymeric ripcord), beneath the film 126 and visible through the film 126, which may include indicia as to contents of the core 112 or a particular location along the length of the cable 110.

According to an exemplary embodiment, the film 126 is continuous peripherally around the core, forming a continuous closed loop (e.g., closed tube) when viewed from the cross-section, as shown in FIGS. 1-2, and is also continuous lengthwise along a length of the cable 110, where the length of the cable 110 is at least 10 meters (m), such as at least 100 m, at least 1000 m, and may be stored on a large spool. In other contemplated embodiments, the cable 110 is less than 10 m long.

Referring to FIGS. 1-2, in some embodiments, around the cross-sectional periphery of the film 126, 826, the film 126, 826 takes the shape of adjoining core elements 114 and extends in generally straight or convex paths over interstices 144 between the core elements 114, which may, in some embodiments, result in a generally polygonal shape of the film 126 with rounded vertices, where the number of sides of the polygon corresponds to the number of adjoining core elements 114. In some embodiments, the film 826 arcs into the interstices 144 so that the film 826 does not extend tangentially between adjoining core elements 114, but instead undulates between concave arcs 146 and convex arcs 148 around the periphery of the stranded elements 114 and intermediate interstices 144. The concave arcs 148 may not be perfect circular arcs, but instead may have an average radius of curvature that is greater than the radius of one or all of the stranded elements 114 and/or the central strength member 124. Put another way, the degree of concavity of the concave arcs 146 is less than the degree of convexity of the convex arcs 148. Applicants theorize that the undulation between concave arcs 146 and convex arcs 148 constrains the stranded elements 114, opposing unwinding of the stranded elements 114 about the central strength member 124. Applying a vacuum to the interior of the extrusion cone (see space 316 in FIG. 4) may increase the draw-down rate of the extrudate, and may facilitate formation of the concave arcs 146. Applicants further believe that the undulation and concave arcs 146 increase the torsional stiffness of the film 826.

Use of a continuous film 126, 826 may block water from being able to reach the core 112 (e.g., film 126, 826 may be water impermeable, water-resistant). In other embodiments, the film 126 includes pinholes or other openings. In some contemplated embodiments, films may be extruded in a crisscrossing net mesh pattern of film strips, or as a helical or counter-helical film strip(s), such as via rotating crossheads or spinnerets. Either the core or the cross-head may be rotated, and the core may be rotated at a different rate than the cross-head, or vice versa. In other contemplated embodiments, a pre-formed curled or C-shaped tube may be used as the film 126, where the core 112 is bound thereby.

Referring to FIG. 2, in some embodiments the film 826 is in tension T around the core 112, where hoop stress is spread relatively evenly around the transverse (i.e., cross-sectional) periphery of the film 826 where the film 826 overlays (e.g., contacts directly or indirectly) elements of the core 112. As such, the film 826 opposes outwardly transverse deflection of the core elements 114 relative to the rest of the cable 110, such as outward torsional spring force of S-Z stranded core elements 114, buckling deflection of un-stranded core elements 114, such as flat fiberglass yarns, or other loading. As such, the tension T in the film 826 may improve cable stability and integrity, such as in compression of the cable 110. Other films disclosed herein, such as film 126, may be likewise in tension. In other contemplated embodiments, the films 126, 826 may be in tension that is subsequently relaxed, such as upon exposure to heat; or, may not be in tension at all or at any time.

In some embodiments, the tension T of the film 826 has a distributed loading of at least 5 newtons (N) per meter (m) length of the cable 110, which may be measured by measuring the average diameter of an intact film 826 surrounding the core elements 114, then opening the film 826, removing the core elements 114, allowing time for the film 826 to contract to an unstressed state (e.g., at least a day, depending upon material) at constant temperature, then measuring the decrease in film 826 widthwise dimension (i.e., compared to the average periphery). The tension T is the loading required to stretch the film 826 to the original width.

Figure 3:
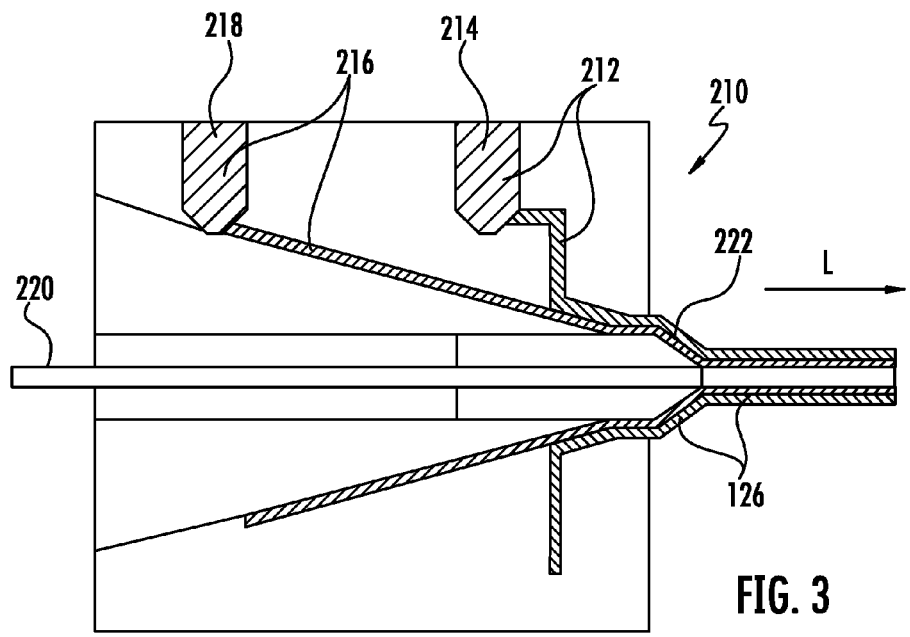
FIG. 3 is a side cross-sectional view of a multi-layer film structure according to an exemplary embodiment.

Referring to FIG. 3, an extruder 210 (e.g., crosshead) includes a flow path 212 for a first extrudable polymer 214 (e.g., polypropylene) and a flow path 216 for a second extrudable polymer 218. Similar extruders may have additional such flow paths for third, fourth, fifth, etc., extrudable polymers. In FIG. 3, the first and second extrudable polymers 214, 218 may be co-extrudable with one another, meaning that the first and second extrudable polymers 214, 218 have a sufficiently close melting point (e.g., within 80° C., within 50° C.) and corresponding viscosity, among other parameters, that the first and second extrudable polymers 214, 218 are compatible for co-extrusion. In some embodiments, the extrusion paths 212, 216 converge such that the first and second extrudable polymers 214, 218 are co-extruded in the extruder 210.

In other embodiments, the first and second extrudable polymers 214, 216 may be discretely extruded, such as in tandem by separate extruders on a manufacturing line or by multiple passes through the same extruder. According to an exemplary embodiment, the first and second extrudable polymers 214, 218 draw down onto core elements 220 of the cable that pass through the extruder 210 and into the extrusion cone 222 of the first and second extrudable polymers 214, 218. The core elements 220 may include optical fibers and/or a tube or tubes surrounding optical fibers, among other elements. In some embodiments, the film 126 is then rapidly cooled, such as in a water trough. In some embodiments, the film may be subsequently constrained following extrusion, as shown in FIG. 4 and explained below.

Still referring to FIGS. 2-3, the corresponding fiber optic cable that includes core elements 114, 124, 220 and a multi-layered flame-retardant film structure, shown as film 126 in FIG. 3 (and FIG. 1) and film 826 in FIG. 2, where the films 126, 826 are surrounding the core elements 114, 124, 220. The core elements 114, 124, 220 include an optical fiber 118 and a tube 116 surrounding the optical fiber 118 (see FIG. 1). The film structure 126, 826 includes a first film and a second film 810 and 813 in FIG. 2. Both the first and second films 810 and 813 may include extrudable polymers that include a base material and a flame-retardant filler material. Also, both the first and second films 810 and 813 may have an average thickness over a 10-meter length of the cable that is less than 500 micrometers. In other embodiments, the film 126 may be only a single layer of material, as shown in FIG. 1.

According to an exemplary embodiment, the composition of the second film differs from the composition of the first film. For example, the base material of the first and second films may differ. The base material of one film may be primarily polyethylene, such as the film 810, and the base material of the other film may be primarily polyvinyl chloride, such as film 813, or another material, such as nylon. In other embodiments, the composition of the second film 813 differs from the composition of the first film 810, but the base material is the same. In some such embodiments, the first and second films have different filler materials, such as one film having a flame-retardant filler material, as disclosed herein, and another of the films having an intumescent material, as disclosed herein, as a filler material. In still other embodiments, the composition of the second film differs from the composition of the first film at least with respect to concentration of the flame-retardant filler material or other filler material. In some such embodiments, the difference in concentration of the flame-retardant filler material in the first and second films on average in the 10-meter length of the cable is substantial, such as at least 10% by weight, at least 20% by weight, at least 30% by weight of the respective film. Such a quantity may be measured by averaging at least 100 samples of the film, such as via spectroscopy, taken at even intervals along the length of the 10-meter section of the cable.

In some embodiments, the first and second films 810, 813 may not bond with one another or bond well with one another, such as with one of the films 810, 813 having polar base materials and the other having nonpolar base materials. In some such embodiments, a third internal layer 812 (FIG. 2) may be used to tie the first and second films 810, 813 together. In other contemplated embodiments, the third internal layer 812 may serve purposes other than tying the first and second films 810, 813 together. For example, in some such embodiments, the first and second films 810, 813 hold the third internal layer 812 in place and together, where the third internal layer 812 is not sufficiently cohesive without the first and second films 810, 813. In some such embodiments, the third internal layer 812 has a particularly high concentration of flame-retardant and/or intumescent material, relative to the first and second films 810, 813. For example, the third internal layer 812 may consist primarily of flame-retardant material(s), such as those flame-retardant materials disclosed herein, such as the third internal layer 812 having a composition of more than 50%, more than 60%, more than even 80% of such flame-retardant material(s). In some embodiments, on average in the 10-meter length of the cable, the percentage by weight of the composition of the layer 812 between the first and second films 810, 813 that is the flame-retardant filler material is substantially greater (e.g., at least 10% greater, at least 20% greater, at least 30% greater) than the percentage by weight that is the flame-retardant filler material of at least one of the first and second films 810, 813. Further, in some such embodiments, the third internal layer 812 is substantially thicker than the first and second films 810, 813, where the first and second films 810, 813 may have the dimensions of other films as disclosed herein, such as where the third internal layer 812 is at least twice as thick on average in the 10-meter section of the respective cable as the first and/or second films 810, 813, such as at least three, four, or even five times as thick thereof. In some such embodiments, the combined film structure 826 (FIG. 2) may serve as both the binder film for stranded elements 114 and as a jacket of the respective cable. In other such embodiments, the combined film structure 826 may not even serve as a binder. In other embodiments, the third internal layer 812 is a film, and overall the multi-layered flame-retardant film 826 structure has an average thickness over the 10-meter length that is less than 500 micrometers.

Referring now to FIG. 4, the film 126, shown as the extrusion cone 222 contracting about the core 112 along the manufacturing line direction L, where the core 112 is specifically a core of stranded elements as opposed to the more generic core elements 220 of FIG. 3. Accordingly, the extrusion cone 222 may be applied in conjunction with a manufacturing process or method 310 that may include stranding. In some such embodiments, the core elements 114 (see also FIGS. 1-2) (e.g., buffer tubes, aramid, tight-buffered fibers, micromodules) are stranded by extending an oscillating nose piece 312 through a crosshead and into a space 316 surrounded by the extrusion cone 222 of the film 126.

In some such embodiments, the film 126 is extruded around the core elements 114 immediately after the core elements 114 are stranded around the central strength member 124, such as within a distance of at least ten lay lengths (e.g., within six lay lengths) of the strand from the closing point of the core elements 114, where the core elements 114 come together at the trailing end of the stranding machine in the pattern of stranding of the core 112. Close proximity of the stranding machine and the extruder essentially allows the stranding machine to compensate for slipping and/or unwinding between the stranded elements 114 and the central strength member 124, such as due to the pull of the extrusion cone 222 (prior to coupling between the stranded elements 114 and the central strength member 124 by the film 126 and/or caterpuller 320).

An industry-standard definition for the lay length of helically stranded elements (e.g., helical lay length) is the lengthwise distance along the cable (and along a central strength member, if present) for a full turn of the stranded elements 114 about the lengthwise axis of the cable (e.g., the length through the center of a single helical spiral). An industry-standard definition for the lay length of reverse-oscillatory stranded elements, such as SZ stranded elements 114, is the lengthwise distance between reversal points of the strand divided by the sum of turns of the stranded elements (such as turns about a central strength member) between the reversal points, which may include a fraction of a turn; akin to the "average" helical lay length.

In the space 316 and outside the extrudate cone of the film 126, powder particles 136 (see FIG. 4), such as super-absorbent polymer particles (e.g., Cabloc® GR-111), intumescent particles, flame-retardant particles, solid lubricant particles, etc. may be embedded in the film 126 by pneumatic conveyance, such as by being carried and deposited via a spinning vortex of turbulent air flow in a chamber 314 (FIG. 4) outside the extrudate cone of the film 126 and/or by being drawn into a high-pressure air flow by a venturi nozzle and carried thereby until accelerated and then released from the air flow via a conventional nozzle in or directed to the interior of the extrudate cone of the film 126. According to such an embodiment, momentum of the powder particles 136 causes them to impact walls of the molten extrudate cone of the film 126. The force of impact and the state of the extrudate (e.g., polyethylene) causes the particles to mechanically adhere to the film 126, but may not arrest elongation of the extrudate, permitting the extrudate to continue to draw/shrink to a relatively thin film that may form tightly around the core elements 114.

Air flows carrying the powder particles 136 may synergistically be used to hasten cooling of the film 126, and may still further be used to shape or thin-out the film 126. Additional flows of cooling fluid 318 (e.g., dry air if associated film 126 surface(s) are with super-absorbent polymer particles; fine water mist or water bath, if surfaces are without super-absorbent polymer particles) may be used to further hasten cooling of the film 126 so that the film 126 will be sufficiently cooled and solidified in order to constrain the core elements 114 within fractions of a second after stranding of the core elements 114 in some embodiments. Furthermore, air flows carrying the powder particles 136 may be coordinated on opposite sides of the film to control shaping of the film 126 and/or prevent distortion of the film 126. Adherence of the particles 136 to the film 126 may assist containing the particles 136 during cable end- and mid-span access.

In some embodiments, the film 126 is continuous and watertight, which may prevent the powder particles 136 (e.g., super-absorbent polymer particles) in the interior of the film 126 from absorbing moisture or water on the exterior of the film 126. To prevent axial migration of water along the exterior of the film 126, between the film 126 and additional cabling layers—such as metallic armor, nonmetallic armor, additional strength elements, and/or an additional exterior jacket over the cable core, or for other reasons; the powder particles 136 may be applied to the exterior of the film 126 while the film 126 is still molten and immediately prior to receipt of the cable 110 by an anti-torsion caterpuller 320. The caterpuller 320 may be particularly useful for reverse-oscillatory stranding patterns, such as so-called "SZ" strands, because the caterpuller 320 holds down and constrains the reversal. As such, the caterpuller is preferably positioned within a distance of at least one lay length of the strand from the closing point of the core elements 114, where the core elements 114 come together at the trailing end of the stranding machine in the pattern of stranding of the core 112. The extrusion head 414 and extrudate cone (see FIG. 4) is located between the stranding machine and the caterpuller 320.

Particularly in stranding arrangements of core elements 114 that include reverse-oscillatory winding patterns (e.g., S-Z stranding), the anti-torsion caterpuller 320 may serve to apply an opposing torque to torque induced by tension and rotation of the core elements 114. Belts 322 of the anti-torsion caterpuller 320 may be coupled together so that the belts 322 register on the centerline of the cable 110, which permits automatic adjustment of the spacing of the belts for different cable diameters. According to an exemplary embodiment, the caterpuller 320 is located within 100 mm of the release point of the oscillating nose piece 312 or the closing point of the core elements 114, where the core elements 114 come together, such as to contact one another and/or a central strength member (see, e.g., central strength member 124 as shown in FIG. 1). Close proximity of the caterpuller 320 and closing point of the core elements 114 prevents the core elements 114 from unwinding when the strand direction is reversed. The caterpuller 320 also isolates tension of individual core elements 114 on the in-coming side thereof, reducing the likelihood of distorting desired shapes of the film as the core 112 (see also FIGS. 1-2) is formed. Further, the caterpuller 320 allows the film 126 to cool quickly while not under load from released spring forces of the stranded elements 114 (which are constrained instead by the belts of the caterpuller 320). As such, the film 126 is able to cool and constrict to a degree that applies a load to the stranded elements 114 that compresses the elements 114 against the central strength member 124, providing coupling therebetween. Without the caterpuller 320 and/or cooling pneumatic air flow 318, the film 126 may be outwardly loaded by release of spring forces in the stranded elements 114 while cooling (i.e., film solidifies while outwardly stretched) such that the resulting cooled film 126 may not provide sufficient coupling force between the stranded elements 114 and central strength member 124 to prevent formation of a "bird cage," resulting in bulges in the finished cable at the reversal points of the stranded elements 114. When the core exits the caterpuller 320, the core elements 114 are constrained from unwinding by the solidified film 126 in such embodiments. In some contemplated embodiments, the caterpuller 320 may further be used for cooling (e.g., includes cooled belts) and/or may include a series of shaped rollers, such as having a groove along which the core 112 is constrained.

According to an exemplary embodiment, the film 126 maintains the integrity of the core 112 during subsequent processing steps, which may include tight bends of the cable 110 and/or applications of additional cable components. In some embodiments, the film 126 has the additional advantageous feature of removal by initiating a tear, such as with ripcords 142 positioned beneath the film 126 (see ripcords 142 above and below the film 126 as shown in FIG. 1). The film 126 distributes the load from such ripcords 142 over a larger area of core elements 114 (when compared to ripcords beneath binder yarns), which reduces pressure on the core elements 114 during the tear.

Still referring to FIG. 4, a method 310 of manufacturing a fiber optic cable 110 includes steps of stranding core elements 114 about a central strength member 124, forming a film 126 to surround the core elements 114 and to at least partially constrain the core elements 114, constraining the core 112 while the film 126 solidifies and contracts, and/or extruding a jacket 134 of the cable 110 to surround the film 126. The jacket 134 may be thicker than the film 126. Alternatively, the jacket 134 may be formed form additional layers of the film 826, such as at one layer 813 in addition to a base layer 810 (e.g., binder layer), such as at least two additional layers 812, 813, at least three additional layers; where, in some such embodiments, all the layers 810, 812, 813 are about the same thickness and/or are all relatively thin, such as less than 500 microns each, less than 300 microns each, and/or even less than 250 microns each in average thickness per layer over a 10-meter length of the cable 110 and within ±50 microns in thickness of one another.

According to an exemplary embodiment, the core elements 114 include a tube 116 surrounding at least one optical fiber 118, and a plurality of additional core elements 114, such as at least one of a filler rod 112 and an additional tube 116'. In some such embodiments, the film 126, 826 includes (e.g., comprises, consists essentially of, consists of) one or more layers of material having a Young's modulus of 3 gigapascals (GPa) or less. In some such embodiments, the method 310 further includes steps of forming the film 126, 826 so that the film 126 is 0.5 mm or less in thickness, and actively cooling the film 126, 826. As the film 126, 826 cools, such as by a cooling flow of air, and the core 112 may be supported by a caterpuller 320, the film 126, 826 shrinks around the core elements 114 to constrain the core elements 114 such that the core elements 114 may be bound to the central strength member 124 under tension T of the film 126, 826 and such that a coupling force (e.g., static frictional force) between the core elements 114 and the central strength member 124 limits axial and/or outward migration of the core elements 114 from the central strength member 124. In some such embodiments, the method 310 further includes moving powder particles 132, 136 and directing the powder particles 132, 136 toward the film 126, 826 and/or central strength member 124, while the film 126, 826 and/or up jacket 130 is at least partially fluid (e.g., tacky). At least some of the powder particles 132, 136 are partially embedded in one or more layers (e.g., outer layers) of the film 126, 826 and/or up jacket 130 upon cooling.

Such a manufacturing process 310 may remove a need for some or all binder yarns and water-blocking tape, flame-retardant tapes, and other components, and replace such components with a continuously-extruded film 126 that may have particles 136 embedded in the interior surface of the film 126 and/or on the exterior surface of the film 126. In addition, the film 126 may constrain the reversal of stranded core elements 114 in the radial direction. Rip cords 142, material discontinuities 140, or other access features may be integrated with the cable 110, such as being located outside of, in, or underneath the film 126 for either armored- or duct-type cable (see generally FIG. 1).

Referring again to FIG. 4, core elements 114, in the form of the tubes 116 containing optical fibers 118, are guided through an extrusion crosshead and tip by a stranding (oscillating) nose piece 312 in some embodiments. An extruded film 126 is applied to the core 112 immediately after the core 112 is formed by the oscillation of the nose piece 312. Rotation of the stranded core 112 and central strength member 124 is limited by the anti-torsion caterpuller 320. Further, the anti-torsion caterpuller 320 may serve to prevent unwinding during the reversal of the oscillation direction, allowing the film 126 to quickly cool and constrict to load the stranded elements 114 against the central strength member 124 such that there is sticking contact therebetween (e.g., static friction) that limits axial migration of the stranded elements 114.

The film 126 may be applied with no powder particles. In some embodiments, the cable 110 may be produced with an interior application of powder particles 136 but without an exterior application thereof. Residual powder particles may pass through gaps between the core elements 114 to the central strength member 124 where the powder particles may be captured by the tubes 116 and other interior surfaces of the core 112. In FIG. 4, powder particles 136 are applied to the interior and exterior of the extrudate cone of the film 126. In some embodiments, the powder particles 136 are applied only to the exterior of the extrudate cone of the film 126.

Use of a film 126, 826, as disclosed herein, may permit continuous or near-continuous cable 110 production, may eliminate binder yarn indentations on core elements 114, may remove cable binding as a production speed constraint, may permit stranding to be speed matched with jacketing, may contribute to the strength of the jacket 134, may replace water-blocking tape, and other components, may eliminate the associated tape inventory and the tape-width inventory subset, may allow access by ripcord 142 to the core elements 114 (where binder yarns generally cannot be cut by the ripcord, as discussed), may provide significant savings in materials, and/or may allow for removal of water-blocking yarn wrapped around the central strength member in some conventional cables.

In alternate contemplated embodiments of the above-disclosed cables 110 and manufacturing methods 310 and equipment, a capstan may be used in place of the caterpuller 320. In some embodiments, powder 136 may not be applied to the exterior of the film 126, and/or a water bath may be used to increase the cooling rate. Further, the caterpuller 320 or at least a portion thereof may be submerged in the water bath. In some embodiments, powder 136 may not be applied to the interior surface of the film 126, or to either the interior or the exterior surfaces of the film 126. Thermoplastics and/or materials, such as flame-retardant materials, other than polyethylene may be used to form the film 126. The film 126 may be of various colors, and may have UV stabilizers that permit the film 126 as the exterior of a finished outdoor product. The film 126 may be printed upon. The film 126 may include tear features 140, such as those as disclosed herein with regard to the jacket 134. In some embodiments, the film 126 may surround a broad range of different types of stranded cable components, such as S-Z stranded tight-buffered fibers, filler rods, fiberglass yarns, aramid yarns, and other components.

Two potential base materials for the film 126 include high-density polyethylene and polypropylene. The polypropylene "melting point" is closer to (e.g., within 50° C.; within 30° C.) the processing/extrusion temperature (e.g., about 200-230° C.±20° C.) of extrusion processes disclosed herein, which is useful for quickly solidifying the film 126 (i.e., less change in temperature is required to achieve solidification after extrusion), such that the film 126 contracts while the stranded elements 114 are constrained by the caterpuller 320 so that the film 126 loads the stranded elements 114 in compression with the central strength member 124 providing a coupling force therebetween.

According to an exemplary embodiment, materials of layers of the film 126, 826 may be selected such that the melting temperature of the material is less (e.g., at least 30° C. less, at least 50° C. less) than the extrusion temperature (e.g., about 200-230° C.±20° C.) of a jacket 134 (see FIG. 1) that is subsequently extruded over the film 126, 826. In some such embodiments, an outer layer of the 126, 826 melts or blends into the jacket 134. In other embodiments, the film 126 maintains separation from the jacket 134 by intermediate material, such as super-absorbent polymer particles or non-compatible materials. Applicants theorize that a reason the stranded elements 114 may not migrate axially or outwardly during extrusion of the jacket 126, while melting or softening of the film 126, is that, by the time of subsequent extrusion of the jacket 126 (e.g., at least 2 seconds following stranding and application of the film 126, at least 5 seconds, at least 10 minutes), the stranded elements 114 have sufficiently conformed to the geometry of the stranding pattern due to stress relaxation of the materials of the stranded elements 114, reducing spring forces initially carried by the stranded elements 114 upon stranding; and Applicants theorize that the jacket 134 positively contributes to radial tension applied by the film 126 to constrain and normally load the core elements 114 to the central strength member 124.

Further, Applicants have found that application of the film 126 at extrusion temperatures above the melting temperature of the stranded elements 114 (e.g., at least 30° C. above, at least 50° C. above) does not melt or substantially deform the stranded elements 114. As such, the film 126 may include the same or similarly-melting polymers as buffer tubes 116, 116' stranded in the core 112, such as polypropylene. Further, Applicants have found very little or no sticking between the film 126 and buffer tubes 116, 116' stranded in the core 112, presumably due to the rapid cooling techniques disclosed herein, such as actively directing a flow of cooling air, caterpuller 320 in a water bath, thin film layer, film material selected for solidification/crystallization temperatures of the film 126 close to the extrusion temperature, and/or other techniques. In some embodiments, one or more of the layers includes and/or primarily consists of (more than 50% by weight) higher strength (EA) materials such as polyester.

Applicants theorize, the effectiveness of a material for the film 126 may be related to temperature of crystallization, at which crystals start growing and therefore mechanical properties start developing. It is Applicants' understanding that the temperature of crystallization is around 140° C. for nucleated polypropylene, while the temperature of crystallization is at a lower temperature for high-density polyethylene, such as less than 125° C. Applicants theorize that materials that crystallize at higher temperatures will lock down faster for film 126 applications as disclosed herein (i.e. such materials apply more radial force to the core 112 earlier).

In contemplated embodiments, one layer of the film 826 (e.g., polypropylene base material) draws down faster than another, and pulls or squeezes the other around the core elements. In some embodiments, the other may be a less-expensive material (e.g., polyethylene base material), but with sufficient strength once solidified to constrain the underlying elements. Other layers may draw down and crystallize at still other rates, such as nylon, and may provide other benefits to the film 826, such as a layer that blocks rodents or termites from penetrating the film 826.

Further, it is Applicants' understanding that, to some degree, draw-down of the base materials continues until the glass-transition temperature is reached. In the case of polypropylene, glass-transition temperature may be reached about −10° C. and for polyethylene −70° C. (but may be as high as −30° C.). Accordingly, such low temperatures will not likely be reached in processing/manufacturing, so layers of the film 826 may actively continue to shrink post-processing (until glass-transition temperatures are reached), which may further improve coupling between the stranded elements 114 and the central strength member 124. For other possible layer materials of the film 826, such as polybutylene terephthalate, with a glass-transition temperature of about 50° C., the normal force applied to the stranded elements may be less because the film 826 may stop actively shrinking or having a bias to shrink. As such combining a layer of higher glass transition temperature material with one having a lower glass-transition temperature may provide the post-processing shrinking benefit to the higher glass transition temperature material.

Further, Applicants have found that the greater strength of polypropylene relative to polyethylene allows the film 126 to be thinner for a polypropylene film 126 to provide the same amount of coupling force between the stranded elements 114 and the central strength member 124 of a purely polyethylene film. For example, a 0.15 mm layer of polyethylene was found to have about a 70 N radial force, while a 0.15 mm layer of polypropylene had about an 85 N radial force. Accordingly, the strength of the polypropylene layer may supplement the polyethylene layer, but the polyethylene layer may provide benefit not provided by polypropylene, such as cohesive bonding of the polyethylene to a polyethylene jacket.

In some embodiments, the film 126 is formed from a first base material and the jacket 134 is formed from a second base material. The second base material of the jacket 134 may be a blended composite of polymers, as opposed to a composite of discrete layers, where the second base material is a blended composite that may include, such as primarily include (>50% by weight), a first polymer such as polyethylene or polyvinyl chloride; and the first material of the film 126 may also be a blended composite of polymers, and include, such as primarily include, a second polymer, such as polypropylene. In some embodiments, the first material further includes the first polymer (e.g., at least 2% by weight of the first material, at least 5% by weight, at least 10% by weight, and/or less than 50% by weight, such as less than 30% by weight). Inclusion of the first polymer in the first material of the film 126, in addition to primarily including the second polymer in the blended composite first material, may facilitate bonding between the first and second materials so that the film 126 may be coupled to the jacket 134 and automatically removed from the core 112 when the jacket 134 is removed from the core 112, such as at a mid-span access location. Similarly, in other embodiments, one or more layers of the film 126, such as outermost layer(s) as shown in FIGS. 1-2, may be a blended composites designed to cohesively adhere to the jacket and/or underlying components, such as buffer tubes, by including common polymers of the jacket and/or underlying components.

Figures 5, 6:
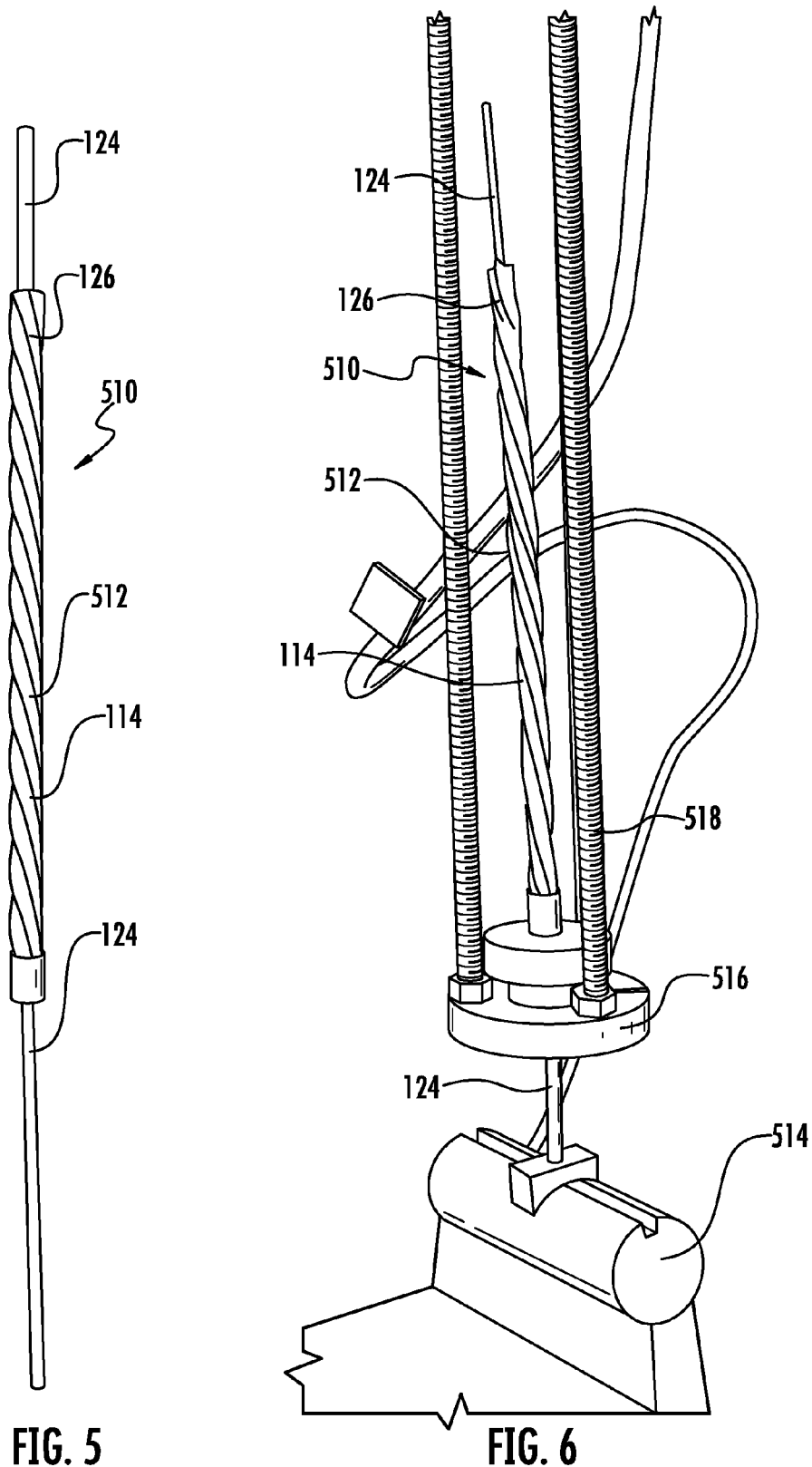
FIG. 5 is a digital image of a sample of stranded elements bound around a central strength member, with the central strength member projecting from ends thereof so that the sample is configured for a pull-through test to measure coupling force, according to an exemplary embodiment.
FIG. 6 is a digital image of the sample of FIG. 5 in a pull-through test rig, with the central strength member fixed in a clamp and a tensile test apparatus configured to pull the stranded elements axially upward relative to the central strength member to determine the coupling force, according to an exemplary embodiment.

FIGS. 5-6 show a sample 510 of a core 512 of stranded elements 114 within a film 126 that is configured for a pull-through test to determine the coupling force between the stranded elements 114 and the central strength member 124. As shown in FIG. 5, the central strength member 124 extends from the stranded elements 114 by a distance of about 50 mm. As shown in FIG. 6, the extended portion of the central strength element 124 is held fixed with a clamp 514. A plate 516 with an opening just wide enough for the central strength member is attached to a tensile test apparatus 518 so that as the apparatus 518 lifts the plate 516, and the plate 516 pushes the stranded elements 114 along the central strength member 124. Applicants have found that the film 126, as disclosed herein, results in a (net) static friction force between the stranded elements 114 and the central strength member 124 of at least 10 N for a 100 mm length of stranded elements, such as at least 15 N.

Via pull-through testing, Applicants have found that the magnitude of the static friction force is related to the thickness and composition of the film 126. For a film 126 having a polypropylene layer of at least 0.02 mm but less than 0.04 mm in average wall thickness, the static friction force for a 100 mm section of stranded elements 114 (without a jacket) is at least 10 N, such as about 12.4 N, and/or the average static friction force for a 200 mm section of stranded elements 114 is at least 20 N, such as about 23.1 N. Accordingly, for such a film 126, the reverse-oscillatory stranding pattern must be such that the net spring force of the stranded elements 114 is about 10 N or less for a 100 mm section to prevent axial migration of the stranded elements 114 and formation of a "bird cage" during manufacturing.

Applicants have also found, for a film 126 of at least 0.08 mm but less than 0.15 mm in average wall thickness, the average static friction force for a 100 mm section of stranded elements is at least 20 N, such at least 30 N, and/or the average static friction force for a 200 mm section of stranded elements is at least 40 N, such as at least 50 N. Some testing included stranded elements bound by both film 126 and binders yarns to determine the contribution of the film 126.

Figures 7, 8:
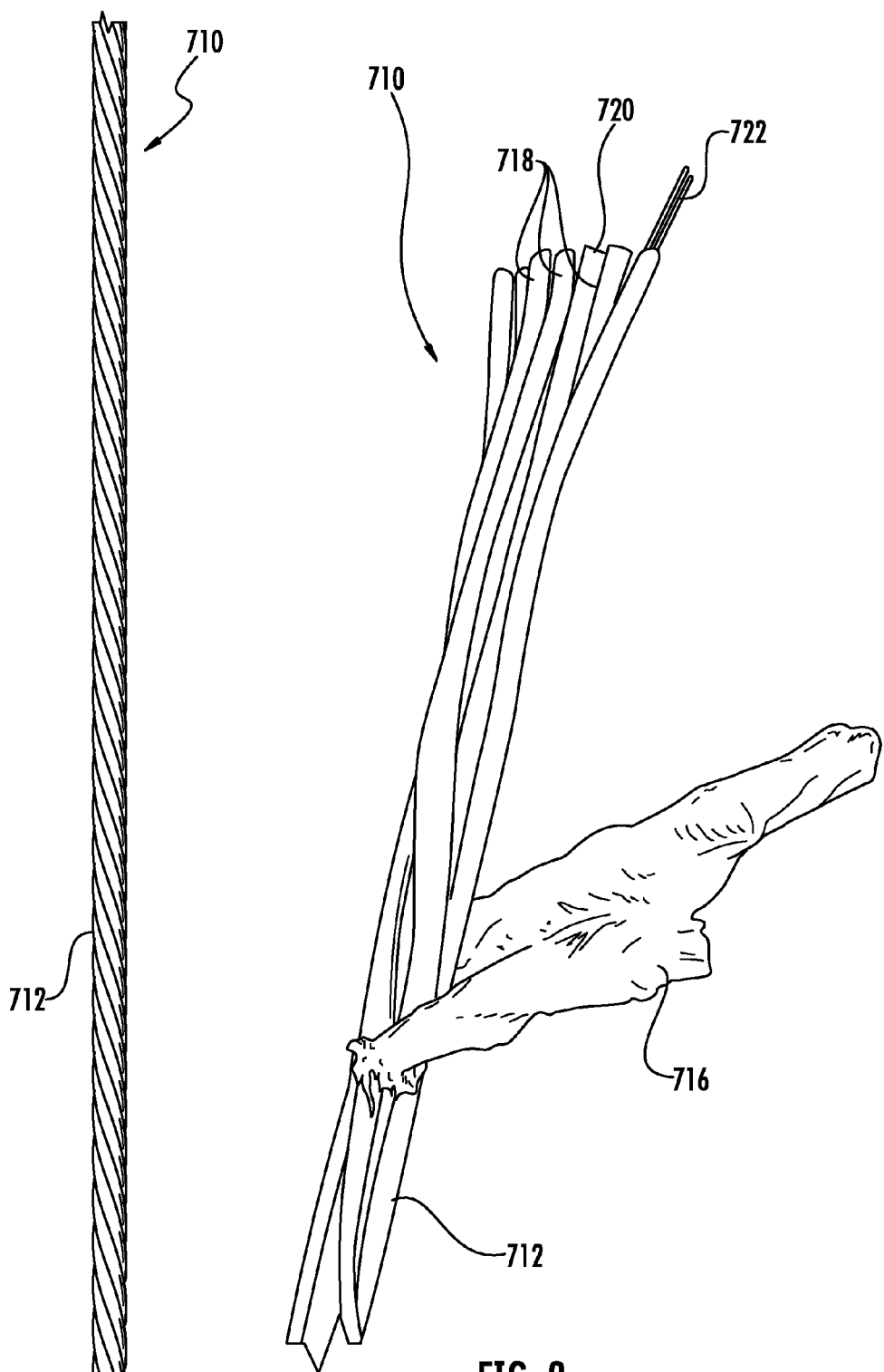
FIG. 7 is a digital image of a core of stranded elements bound by a film according to another exemplary embodiment.
FIG. 8 is a digital image of the core of FIG. 7 with the film torn away from an end of the core to release the stranded elements and the central strength member.

Referring to FIGS. 7-8, a stranded core 712 of a cable 710 includes a film 716 that constrains the stranded elements 718 having a reversal 714. In some embodiments, the core 712 may be enclosed within a jacket (see FIG. 8). As shown in FIG. 8, the film 716 is a thin polymeric material (e.g. polypropylene, polyethylene), which can be torn and peeled back by hand to provide access to the stranded elements 718 and central strength member 720. Once released from the film 716, the stranded elements 718 may decouple from the central strength member 720, as shown in FIG. 8. Optical fibers 722 extend from the end of one of the stranded elements 718, which is a buffer tube 724 including polypropylene. Other stranded elements 718 in FIG. 13 are "dummy" tubes or solid polymeric rods that fill positions in the strand.

As mentioned above, the material of the film 716 may be selected so that the film 716 is at least partially translucent, as shown in FIGS. 7-8. For some embodiments, the jacket may be pulled back or be otherwise removed, with the film 716 intact. A reversal point in the strand can be easily located through such a film 716, which can then be accessed, as shown in FIG. 7.

Referring once more to FIG. 1, the buffer tubes 116 disclosed herein may include base materials, such as polypropylene, polyvinyl chloride, polycarbonate, polybutylene terephthalate, and/or other polymers. Fillers, additives, and other components may be added to the polymers. In some embodiments, in addition to the optical fibers 118, the buffer tubes 116 are filled with a filling compound, such as a grease or petroleum-based gel. The filling compound water-blocks the buffer tubes 116 and provides coupling between the optical fibers and the buffer tubes 116. In other embodiments, the buffer tubes 116 are "dry" and are free of filling compound, as discussed above. In such embodiments, the buffer tubes 116 may be water-blocked by water-swellable powder, such as super-absorbent polymer, which may be impregnated in a yarn extending through the cavity of the buffer tubes 116 and/or the powder may be mechanically attached to the interior of the buffer tube 116, as discussed above.

According to an exemplary embodiment, the buffer tubes 116 have an outer diameter that is 3 millimeters or less, such as 2.5 millimeters or less, or even 2 millimeters or less. The buffer tubes 116 may have an average wall thickness of at least 100 micrometers, such as at least 200 micrometers, and/or less than a millimeter. As the number of optical fibers 118 increases for the same size buffer tube 116, the freedom of the optical fibers therein to bend and have excess optical fiber length decreases. Each buffer tube 116 may include at least one optical fiber 118, such as at least four optical fibers, such as at least twelve optical fibers. Dummy rods may replace one or more of the buffer tubes 116, as discussed above.

According to an exemplary embodiment, the optical fibers 118 include a glass core immediately surrounded by a glass cladding, which is immediately surrounded by one or more layers of a polymer coating, such as softer, stress-isolation layer of acrylate immediately surrounded by a harder shell of acrylate. According to an exemplary embodiment, the optical fibers are individual, discrete optical fibers, as opposed to optical fibers of a fiber optic ribbon. In other embodiments, ribbons and/or stacks of ribbons are included. The optical fibers may be single mode optical fibers, multi-mode optical fibers, multi-core optical fibers, plastic optical fibers, optical fibers having a uniform cladding, and/or other types.

The optical fibers 118 may be bend-resistant optical fibers having a cladding that includes annular layers of differing refractive indices or other types of bend-resistant optical fibers. An example of a bend-insensitive, or bend resistant, optical fiber is ClearCurve® Multimode fiber commercially available from Corning Incorporated of Corning, N.Y. In some such embodiments, when bent into a coil having a single turn with a diameter of about 200 millimeters, the optical fibers have a change in optical attenuation (delta attenuation) at 1310 nanometers of about 0.1 dB or less per turn, and more preferably about 0.03 dB or less per turn, where the above delta attenuation is observed at one or wavelengths preferably greater than or equal to 1500 nm, in some embodiments also greater than about 1310 nm, in other embodiments also greater than 1260 nm. Use of bend-resistive optical fibers may facilitate improved optical performance of the associated cable, such as when the cable is stretched.

Lay length of the stranded buffer tubes 116, is discussed above. In some embodiments, the lay length is particularly short, such as less than 1 meter along the length of the respective cable between reversals in a reverse oscillatory stranding pattern, such as less than 750 mm, such as less than 500 mm, such as less than 250 mm, such as even less than 100 mm in some embodiments. Between the reversals in at least some such stranded arrangement, the buffer tubes 116 include at least 2 full turns (i.e. complete spirals) around the central axis of the strand, such as at least 3 full turns, and/or eve at least 4 full turns. The tightness of the stranding pattern relates to the loading required by the respective film 126. In general, tighter the lay pattern, the greater the torsional loading of the buffer tube 116 away from the central axis of the strand (e.g., central strength member) at the reversals. For example, embodiments disclosed herein may achieve the above-described coupling to the central strength member while undergoing such tight lay patterns.

In some embodiments, the jacket 134 and film 126 may blend together during extrusion of the jacket 134 over the film 126, particularly if the jacket 134 and the film 126 are formed from the same material without powder particles 136 therebetween. In other embodiments, the jacket 134 and the film 126 may remain separated or at least partially separated from one another such that each is visually distinguishable when the cable 110 is viewed in cross-section.

As disclosed herein, some embodiments include a composite binder film 826, including multiple layers 810, 812, 813 of the film 126; while other embodiments of films 126 only include a single layer of material. Use of a composite binder film 826 with multiple layers 810, 812, 813 may be useful in several ways. First, the multi-layer film 826 may be used to control coupling of components in the respective cable. In some such embodiments, the film 826 is positioned in the cable 110 between two components, one on either side of the film 826 (see generally FIG. 1). The first component, such as one or more core elements, such as buffer tubes 116, have an exterior of a first material; and the second component, such as an exterior tube surrounding the film 826, such as the jacket 134, has an interior of a second material. In some embodiments, the first material is different than the second material, with various combinations of materials as disclosed herein.

In some embodiments, the film 826 is arranged to reduce or prevent coupling between the film 826 and the adjoining component. For example, in some embodiments the interior-most layer 810 of the film 826 (e.g., closest to the cable center) does not bond or has reduced bonding to the adjoining component, such as buffer tube 116. In some such embodiments, the interior-most layer 810 of the film 826 includes and/or primarily comprises a polar material and the adjoining component (e.g., buffer tube 116) includes and/or primarily comprises a nonpolar material, or vice versa. In some such embodiments, the interior layer 810 of the film 826 primarily comprises (e.g., consists of more than 50% by weight) a base material of polyethylene, such as linear low-density polyethylene, and the exterior of buffer tubes 116 adjoining the film 826 primarily consist of another base material, such as a polymer, such as polycarbonate, polypropylene, polybutylene terephthalate, or another material. In other embodiments, component(s) other than buffer tubes adjoin the interior of the film 826 and the materials of the film 826 are selected based on the corresponding component(s). In some embodiments, both the interior-most layer 810 of the film 826 and the exterior of the adjoining component include thermoplastic material, such as extrudable thermoplastic materials. Use of incompatible or non-bonded materials for the interior-most layer 810 of the film 826 and the adjoining core components may allow for easy separation thereof upon accessing the core and/or for relative movement therebetween, such as to facilitate easy bending of the respective cable 110. With a film 826, 716 selected to minimize or reduce bonding, the film 826 may simply be torn off of or away from the adjoining core components, as shown in FIG. 8.

Similarly, in some embodiments, the outermost layer 813 of the film 826 (e.g., furthest from the cable center), does not bond or has reduced bonding to the adjoining component(s). In some such embodiments, the outer-most layer 813 of the film 826 includes and/or primarily comprises a polar material and the adjoining component (e.g., jacket 134, armor, sheathing, another film surrounding other elements) includes and/or primarily comprises a nonpolar material, or vice versa. In some such embodiments, the outer-most layer 813 of the film 826 includes and/or primarily consists of (e.g., consists of more than 50% by weight) polypropylene, and the interior of the jacket 134 adjoining the film 826 primarily consists of another polymer, such as polyethylene, polyvinyl chloride, or another material. In some embodiments, both the outer-most layer 813 of the film 826 and the interior of the adjoining component are both thermoplastic material, such as extrudable thermoplastic materials. Use of incompatible or non-bonded materials for the exterior-most layer 813 of the film 826 and the adjoining components (e.g., jacket) may allow for easy separation thereof upon accessing the cable core. The jacket 134 may simply be torn off of the film 826 and core components, such as without breaching a water-tight barrier provided by the film 826 (e.g., impermeable barrier). With films 126, 826 that are translucent, as disclosed herein, the reversible point of stranded core components may be located and accessed with minimal and/or reduced exposure of the core components.

Still referring to FIG. 2, the film 826 further includes an internal layer 812 that is interior to both the inner-most layer 810 and outer-most layer 813 of the film 826. The internal layer 812 may bond to both the inner-most layer 810 and outer-most layer 813 of the film 826, and may bind the film 826 together. In some embodiments, the internal layer 812 includes and/or primarily includes a mixed composition that includes polymers from both the inner-most layer 810 and outer-most layer 813 of the film 826. For example, in embodiments where the inner-most layer 810 and outer-most layer 813 of the film 826 includes and/or primarily consist of polyethylene and polypropylene respectively, the internal layer 812 includes and/or primarily consists of a mixture of both polyethylene and polypropylene, such as at least 3% of each by weight, to facilitate cohesive bonding of both the inner-most layer 810 and outer-most layer 813 of the film 826 to the internal layer 812.

In other embodiments, the internal layer 812 is or includes a bonding agent or additive, as discussed above, such as maleic anhydride and/or a copolymer thereof, ethylene acrylic acid and/or a copolymer thereof, or another bond enhancing material. The internal layer 812 may include and/or primarily consist of the bonding agent. In some embodiments, any two and/or all of the inner-most layer 810, the internal layer 812, and outer-most layer 813 of the film 126 are co-extruded with one another (see generally FIG. 3). In other embodiments, some or all of the layers 810 812, 813 are extruded in tandem with one another. In still other embodiments, only the interior-most layer 810 is extruded on a first manufacturing line, and the interior-most layer 810 serves as the binder of the core elements, while the internal layer(s) 812 and/or the exterior-most layer 813 are subsequently extruded and may serve other purposes. In still other embodiments, none of the layers 810, 812, 813 of the film 126 serve as binders, such as for cables where the underlying adjacent component(s) are not stranded.

In contemplated embodiments, the internal layer(s) 812 and/or exterior-most layer 813 provide termite and/or rodent protection to the core, such as by forming a barrier thereto. In some such embodiments, one or more of the internal layer(s) 812 and/or exterior-most layer 813 includes and/or primarily consists of a polyamide, such as nylon, such as nylon-6,6; nylon-6; nylon-6,9; nylon-6,10; nylon-6,12; nylon-11; nylon-12 and nylon-4,6. An internal layer 812 may bond the polyamide to the interior-most layer 810 of the film 826, such as where the interior-most layer 810 includes and/or primarily consists of polyethylene and the internal layer 812 includes maleic anhydride. In still other embodiments, the film 826 includes only (e.g., consists of) two layers, such as an interior-layer 810 adjoining one or more core elements of the cable and an outer-layer 812 or 813. The interior-layer 810 may include a bonding agent to improve bonding to the outer-layer 812 or 813 of the respective film, such as an interior layer 810 of polyethylene with maleic anhydride additive, wherein the interior layer 810 is bonded to an outer-layer 812 or 813 of nylon. Each of the layers 810 and 812 or 813 may be particularly thin, as disclosed herein.

In other embodiments, an arrangement of materials is used to induce bonding of cable components with the film 826, such as where materials of the film 826 are selected to induce bonding with the adjoining cable components. In some embodiments, the respective cable 110 is intended for use in dynamic or extreme environments, and robustness of the cable 110 is enhanced by bonding core components to the film 826 and/or to the jacket 134. Such an arrangement may limit or mitigate relative movement between core components and/or provide greater survivability to the cable 110, such as in twisting, extreme bending, crush, etc. Accordingly, in some such embodiments, the interior-most layer 810 of the film 826 may bond to adjoining core components of the cable 110, such as a polypropylene interior-most layer 810 that cohesively bonds to adjoining buffer tubes 116 of the core that include polypropylene. The exterior-most layer 813 of such a film 826 may include polymeric material that is also in the jacket 134 or other adjoining structure(s) of the respective cable 110, such as a polyethylene exterior-most layer 813 of the film 826 that cohesively bonds to polyethylene in the jacket 134.

In contemplated embodiments, the film 826, including two or more layers, may serve as a jacket for the respective cable core, and may require no additional jacketing or sheathing, such as for a subunit cable of a larger distribution cable, for a cable that is intended for use in less demanding environments, such as with an indoor cable that routes optical fibers through walls of a building and/or a minicable that extends through ducts (see generally FIG. 2), or with other cables. In such an embodiment, only the first layer 810 of the film 826 may serve as a binder, as disclosed herein, and one or more additional layers of the film 826 may provide additional functions, such as environmental robustness. Some or all of the additional layers 812, 813, etc. may be the same material as the innermost layer 810 (e.g., including and/or primarily consisting of: polyethylene, polyvinyl chloride, an extrudable polymer(s), an extrudable thermoplastic(s)) or may be or include different materials. For example, in contemplated embodiments, the jacket 134 of such a cable includes a plurality of thin-film layers 810, 812, 813 that together form the jacket, where each layer is particularly thin, as disclosed above (e.g., less than 500 microns, less than 250 microns), and where the overall film 826 is of sufficient thickness to function as a jacket for the respective cable (e.g., at least 800 microns, at least 1000 microns). Such a jacket may define the exterior of the cable, or may simply define the exterior of a subcomponent of the overall cable (e.g., cable subunit; interior cable within armored cable; indoor portion of indoor/outdoor cable). In some such embodiments, the film 826 includes at least 3 layers, at least 4 layers, at least 5 layers. The layers 810, 812, 813 may be applied via tandem extruders, in separate passes on one or more extruders, or otherwise.

In some embodiments, the film, films, or layers thereof have a base material that is a non-halogenated flame retardant material. The base material may further include a high content of fiberglass, which is intended to improve smoke density performance of the respective cables. If a flame retardant non-corrosive (FRNC) and/or low smoke zero halogen (LSZH) cable design, without the film, films, or layers disclosed herein, narrowly fails the smoke density test according to the IEC61034-2, then adding the film, films, or layers that include the FRNC/LSZH material, with or without fiber glass, may help the augmented cable design pass the smoke density test. Further, if a FRNC/LSZH cable design, without the film, films, or layers disclosed herein, passes the smoke density test according to the IEC61034-2, then using the film, films, or layers including FRNC/LSZH material, with or without fiber glass, may help improve the smoke density performance. Another advantage for such a cable would that, even with a reduction in FRNC/LSZH sheath thickness, the film, films, or layers may still help the cable meet the smoke density requirements according to IEC61034-2, and may thus reduce the overall cost of cable materials.

The construction and arrangements of the cables, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, in some embodiments, cables include multiple layers or levels of core elements stranded around a central strength member 124, where each layer includes a film 126 constraining the respective layer and where film 126 of the outer layer(s) indirectly surrounds the film 126 of the inner layer(s). In contemplated embodiments, the film 126 is not extruded, but is formed from laser-welded tape and/or a heat shrink material, for example. Some elements shown as integrally formed may be constructed of multiple parts or elements, the position of elements may be reversed or otherwise varied, and the nature or number of discrete elements or positions may be altered or varied. In some contemplated embodiments, the film 126 with water-blocking powder, as disclosed herein, may function as an extruded water-blocking element, thereby allowing for continuous cable manufacturing without replacing reels of the water-blocking tape; which, for example, may block water between armor (or other outer layers in a cable) and a core 112, such as a core of stacked fiber optic ribbons or a mono-tube core, or between other components in a cable. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:
   (A) core elements comprising:
      (i) an optical fiber; and
      (ii) a tube surrounding the optical fiber;
   (B) a binder film surrounding the core elements, wherein the binder film comprises:
      (i) a base material, wherein the base material is primarily formed from a polymer, and
      (ii) a filler material, wherein the filler material is a flame-retardant material, and wherein the filler material is dispersed in the base material, and
   wherein the binder film is a binder for the core elements, opposing outwardly transverse deflection of one or more of the core elements; and
   (C) a jacket surrounding the binder film, wherein the binder film is thin, having an average thickness over a 10-meter length of the cable that is less than half an average thickness of the jacket over the 10-meter length.

2. The fiber optic cable of claim 1, wherein the core elements further comprise (iii) one or more additional core elements comprising at least one additional tube surrounding another optical fiber, the fiber optic cable further comprising a central strength member, wherein the core elements are stranded around the central strength member in a pattern of stranding including reversals in lay direction of the core elements, wherein the binder film loads the core elements normally to the central strength member such that contact between the core elements and central strength member provides coupling therebetween, limiting axial migration of the core elements relative to the central strength member.

3. The fiber optic cable of claim 2, wherein the polymer of the base material is non-halogenated.

4. The fiber optic cable of claim 2, wherein the filler material is at least one of alumina trihydrate and magnesium dihydrate.

5. A fiber optic cable, comprising:
(A) core elements comprising:
   (i) an optical fiber; and
   (ii) a tube surrounding the optical fiber;
(B) a multi-layered flame-retardant film structure surrounding the core elements, wherein the film structure comprises:
   (i) a first film comprising an extrudable polymer that includes a base material and a flame-retardant filler material, wherein the first film has an average thickness over a 10-meter length of the cable that is less than 500 micrometers, and
   (ii) a second film comprising an extrudable polymer that includes a base material and a flame-retardant filler material, wherein the second film has an average thickness over the 10-meter length of the cable that is less than 500 micrometers.

6. The fiber optic cable of claim 5, wherein the composition of the second film differs from the composition of the first film.

7. The fiber optic cable of claim 6, wherein the flame-retardant filler material of the first film is the same material as the flame-retardant filler material of the second film.

8. The fiber optic cable of claim 7, the composition of the second film differs from the composition of the first film at least with respect to concentration of the flame-retardant filler material, wherein the difference in concentration of the flame-retardant filler material in the first and second films on average in the 10-meter length of the cable is at least 20% by weight of the respective film.

9. The fiber optic cable of claim 5, wherein the flame-retardant filler material of the first film is the same material as the flame-retardant filler material of the second film,
   the multi-layered flame-retardant film structure further comprising a layer positioned between the first and second films,
   wherein the layer between the first and second films has a higher concentration of the flame-retardant filler material than the concentration of the flame-retardant filler material in at least one of the first and second films, and
   wherein the first and second films adjoin the layer therebetween.

10. The fiber optic cable of claim 9, wherein the flame-retardant filler material is at least one of alumina trihydrate and magnesium dihydrate.

11. The fiber optic cable of claim 9, wherein, on average in the 10-meter length of the cable, the percentage by weight of the composition of the layer between the first and second films that is the flame-retardant filler material is at least 20% greater than the percentage by weight that is the flame-retardant filler material of at least one of the first and second films.

12. The fiber optic cable of claim 9, wherein, on average in the 10-meter length of the cable, at least 50% by weight of the layer consists of the flame-retardant filler material.

13. The fiber optic cable of claim 5, further comprising a jacket surrounding the film structure, wherein the film structure is relatively thin, having an average thickness over the 10-meter length of the cable that is less than half an average thickness of the jacket over the 10-meter length.

14. The fiber optic cable of claim 13, wherein the multi-layered flame-retardant film structure directly contacts the tube, and wherein the multi-layered flame-retardant film structure directly contacts the jacket.

15. The fiber optic cable of claim 14, wherein the extrudable polymer of the first film is a polyethylene.

16. The fiber optic cable of claim 5, wherein overall the multi-layered flame-retardant film structure has an average thickness over the 10-meter length that is less than 500 micrometers.

17. A fiber optic cable, comprising:
(A) a core of the cable comprising core elements, the core elements supporting an optical fiber and forming interstices with respect to one another;
(B) a film surrounding the core elements, wherein the film comprises:
   (i) a base layer comprising a polymer, and
   (ii) powder particles partially embedded in the base layer such that the powder particles have a portion thereof submerged in the base layer passing partly through a surface plane of the base layer and another portion thereof exposed partially projecting away from the surface plane of the base layer, and
   wherein at least some of the powder particles are positioned on an inside surface of the base layer between the base layer and the core elements, and wherein at least some of the powder particles extend into the interstices; and
(C) a jacket surrounding the film, wherein the jacket comprises flame-retardant filler material.

18. The fiber optic cable of claim 17, wherein the powder particles partially embedded in the film comprise particles of intumescent material.

19. The fiber optic cable of claim 18, wherein, prior to expansion from heat exposure, the particles of intumescent material have an average maximum cross-sectional dimension of 500 micrometers or less.

20. The fiber optic cable of claim 17, wherein the film is thin, having an average thickness over a 10-meter length of the cable that is less than half an average thickness of the jacket over the 10-meter length.

* * * * *